United States Patent
Lu et al.

(10) Patent No.: US 11,882,598 B2
(45) Date of Patent: Jan. 23, 2024

(54) PREAMBLE PUNCTURING SUPPORT FOR WIDE BANDWIDTH TRANSMISSION IN WIRELESS COMMUNICATIONS

(71) Applicant: MediaTek Singapore Pte. Ltd., Singapore (SG)

(72) Inventors: Kai Ying Lu, San Jose, CA (US); Yongho Seok, San Jose, CA (US); Chao-Chun Wang, San Jose, CA (US); Jianhan Liu, San Jose, CA (US); James Chih-Shi Yee, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 127 days.

(21) Appl. No.: 17/241,395

(22) Filed: Apr. 27, 2021

(65) Prior Publication Data

US 2021/0345404 A1 Nov. 4, 2021

Related U.S. Application Data

(60) Provisional application No. 63/020,583, filed on May 6, 2020, provisional application No. 63/017,698, filed on Apr. 30, 2020.

(51) Int. Cl.
*H04W 24/08* (2009.01)
*H04W 74/08* (2009.01)
*H04L 1/00* (2006.01)

(52) U.S. Cl.
CPC ....... *H04W 74/0816* (2013.01); *H04L 1/0069* (2013.01); *H04W 24/08* (2013.01)

(58) Field of Classification Search
CPC .......... H04W 74/0816; H04W 74/006; H04W 24/08; H04L 1/0069; H04L 1/0013
See application file for complete search history.

(56) References Cited

U.S. PATENT DOCUMENTS

| 11,146,353 | B2 * | 10/2021 | Li | H04W 74/0808 |
| 11,382,101 | B1 * | 7/2022 | Chu | H04L 5/0044 |
| 2019/0141570 | A1 * | 5/2019 | Verma | H04L 5/0053 |

(Continued)

FOREIGN PATENT DOCUMENTS

| CN | 102960044 A | 3/2013 |
| CN | 104202755 A | 12/2014 |
| CN | 107534472 A | 1/2018 |

OTHER PUBLICATIONS

China National Intellectual Property Administration, First Office Action in China Patent Application No. 202110468490.8, dated Jul. 1, 2023.

*Primary Examiner* — Hassan Kizou
*Assistant Examiner* — Hector Reyes
(74) *Attorney, Agent, or Firm* — Han IP PLLC; Andy M. Han

(57) ABSTRACT

An apparatus (e.g., an access point (AP)) announces to one or more stations (STAs), in a frame, one or more preamble detection (PD) channels in a frequency segment such that each of the one or more STAs monitors a respective one of the one or more PD channels to detect any transmission on the one or more PD channels. The apparatus then wirelessly communicates with at least one of the one or more STAs on one of the one or more PD channels during a transmission opportunity (TXOP).

18 Claims, 15 Drawing Sheets

(56) References Cited

U.S. PATENT DOCUMENTS

| | | | |
|---|---|---|---|
| 2019/0260553 A1* | 8/2019 | Porat | H04L 5/0053 |
| 2021/0153210 A1* | 5/2021 | Li | H04L 1/1614 |
| 2021/0391947 A1* | 12/2021 | Jang | H04L 5/0044 |
| 2021/0400751 A1* | 12/2021 | Patil | H04W 52/0219 |
| 2022/0345937 A1* | 10/2022 | Hu | H04L 5/001 |

* cited by examiner

| Category | Public Action | Channel Switch Mode | New Operating Class | New Channel Number | Channel Switch Count | New Channel Switch Parameters Element | New Country Element | Wide Bandwidth Channel Switch Element | New Transmit Power Envelope Element | Preamble Detection Channel Switch Element |
|---|---|---|---|---|---|---|---|---|---|---|
| | | | | | | | Zero or One | Zero or One | Zero or One | |
| 1 | 1 | 1 | 1 | 1 | 1 | 0 or 8 | Variable | Variable | Variable | Variable |

Octets:

| ELEMENT ID | LENGTH | PD CHANNEL SET NUMBER | PD CHANNEL SET BITMAP | ... | CHANGE COUNT |
|---|---|---|---|---|---|
| 1 OCTET | 1 OCTET | 2 BITS | 4 BITS | ... | 1 OCTET |

PREAMBLE PUNCTURING SUPPORT FOR WIDE BANDWIDTH TRANSMISSION IN WIRELESS COMMUNICATIONS

CROSS REFERENCE TO RELATED PATENT APPLICATION

The present disclosure is part of a non-provisional patent application claiming the priority benefit of U.S. Provisional Patent Application Nos. 63/017,698 and 63/020,583, filed 30 Apr. 2020 and 6 May 2020, respectively, the contents of which being incorporated by reference in their entirety.

TECHNICAL FIELD

The present disclosure is generally related to wireless communications and, more particularly, to preamble puncturing support for wide bandwidth transmission in wireless communications.

BACKGROUND

Unless otherwise indicated herein, approaches described in this section are not prior art to the claims listed below and are not admitted as prior art by inclusion in this section.

In a contention-based channel access wireless communications system, devices access the wireless medium in a wideband system, which includes multiple narrow bands (or channels), by sensing a primary 20-MHz channel (which cannot be punctured). The wideband system allows a device to transmit frames on the primary channel and one or more non-primary channels which are idle. A preamble puncturing mechanism can be utilized to increase spectrum usage when there are radar signals, incumbent signals or overlapping basic service set (OBSS) interferences occurring in one or more non-primary channels. In a wireless system under the Institute of Electrical and Electronics Engineers (IEEE) 802.11ax specification, the HE-SIG-A carries a bandwidth (BW) field which indicates the puncturing pattern (at content channel level) in a primary 80-MHz segment with sufficient information about the intended recipients about how to decode the two SIG-B content channels within the [1 2 1 2] encoding structure in the primary 80-MHz segment.

In next-generation wireless systems such as a wireless local area network (WLAN) under the IEEE 802.11be specification, operations in wider bandwidths, such as 320 MHz, 160+160 MHz, 240 MHz, 160+80 MHz, 160 MHz and 80+80 MHz, are supported and, as such, there may be situations in which some smaller-bandwidth devices (e.g., 80-MHz devices) are associated with a wideband-access point (AP) (e.g., a 320-MHz AP). In order to support small-bandwidth devices in a wide-bandwidth system, some small-bandwidth devices may park on non-primary channels to perform frame exchanges. However, when a preamble is allowed to be punctured on non-primary channels (as preamble puncturing is allowed in any 20-MHz channel of a non-primary 80-MHz segment), how a device detects the preamble without causing a large power consumption or missing the detection needs to be addressed. For instance, data transmission on non-punctured channels of a specific non-primary 80-MHz segment might not be detected by devices when the 20-MHz channel for preamble detection is punctured and, as a result, resources could be wasted.

For extreme-high-throughput (EHT) wide-bandwidth transmissions (e.g., in 160 MHz or 320 MHz), information on punctured channel may be carried in a universal signaling field (e.g., U-SIG) for each 80-MHz segment which varies across different 80-MHz segments as puncturing information in a given 80 MHz is specific to only that specific 80 MHz. As an example, two U-SIG fields (U-SIG1 and U-SIG2) may be carried in a primary 80 MHz and a secondary 80 MHz, respectively, and they may have different contents as the puncturing patterns in the two 80 MHz may be different. In case that a non-access point (non-AP) station (STA) is or will be parking on the secondary 80 MHz, that non-AP STA would need to detect a preamble on a non-punctured 20-MHz channel in order to obtain the U-SIG information in order to further decode its content. However, when the punctured 20-MHz channel is dynamically changed from one 20-MHz channel to another due to interference or other reason(s), an issue arises as to how an effective transmission can be performed.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to preamble puncturing support for wide bandwidth transmission in wireless communications. Under various proposed schemes in accordance with the present disclosure, it is believed that aforementioned issues may be addressed or otherwise alleviated.

In one aspect, a method may involve announcing, to one or more STAs, in a frame one or more preamble detection (PD) channels in a frequency segment such that each of the one or more STAs monitors a respective one of the one or more PD channels to detect any transmission on the one or more PD channels. The method may also involve wirelessly communicating with at least one of the one or more STAs on one of the one or more PD channels during a transmission opportunity (TXOP).

In another aspect, a method may involve receiving, from an AP, a frame announcing one or more preamble detection (PD) channels in a frequency segment. The method may also involve determining one of the one or more PD channels as a PD channel. The method may further involve monitoring the PD channel to detect a transmission on the PD channel.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 7 is a diagram of an example scenario in accordance with the present disclosure.

FIG. 8 is a diagram of an example scenario in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to preamble puncturing support for wide bandwidth transmission in wireless communications. According to the present disclosure, a number of possible solutions may be implemented separately or jointly. That is, although these possible solutions may be described below separately, two or more of these possible solutions may be implemented in one combination or another.

Figure 1:
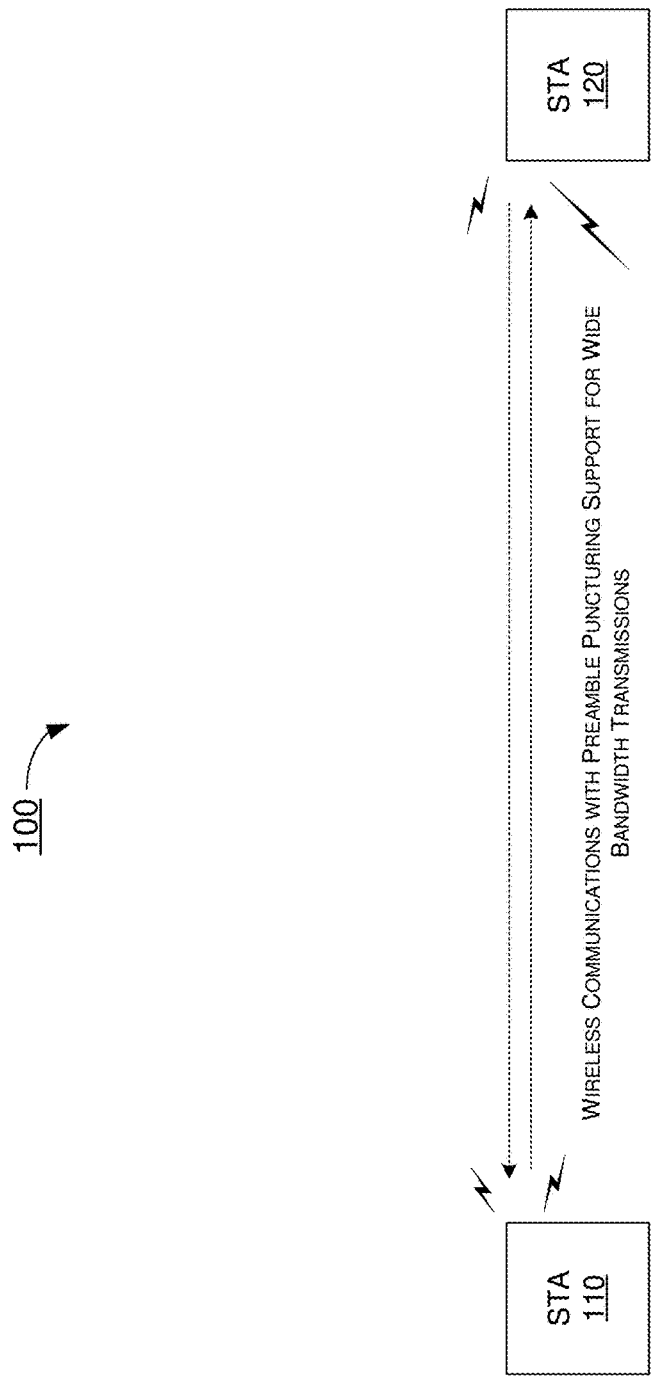
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 15 illustrate examples of implementation of various proposed schemes in network environment 100 in accordance with the present disclosure. The following description of various proposed schemes is provided with reference to FIG. 1~FIG. 15.

Referring to FIG. 1, network environment 100 may involve at least a STA 110 and a STA 120 may be communicating wirelessly with each other in accordance with one or more IEEE 802.11 standards (e.g., IEEE 802.11be). Each of STA 110 (herein interchangeably denoted as "STA1") and STA 120 (herein interchangeably denoted as "STA2") may function as an AP STA or a non-AP STA. Moreover, each of STA 110 and STA 120 may perform wide-bandwidth operations. Under various proposed schemes in accordance with the present disclosure, STA 110 and STA 120 may be configured to perform preamble puncturing support for wide bandwidth transmission in wireless communications in accordance with various proposed schemes described below. It is noteworthy that, in the present disclosure, the term "primary 20-MHz channel" refers to the 20-MHz channel which can be used for channel access. Additionally, the term "segment" refers to a channel segment including multiple 20-MHz channels. Moreover, the term "primary 80-MHz segment" refers to a 80-MHz segment which includes the primary 20-MHz channel. Furthermore, the term "non-primary 80-MHz segment" refers to a 80-MHz segment which does not include the primary 20-MHz channel.

Figure 2:
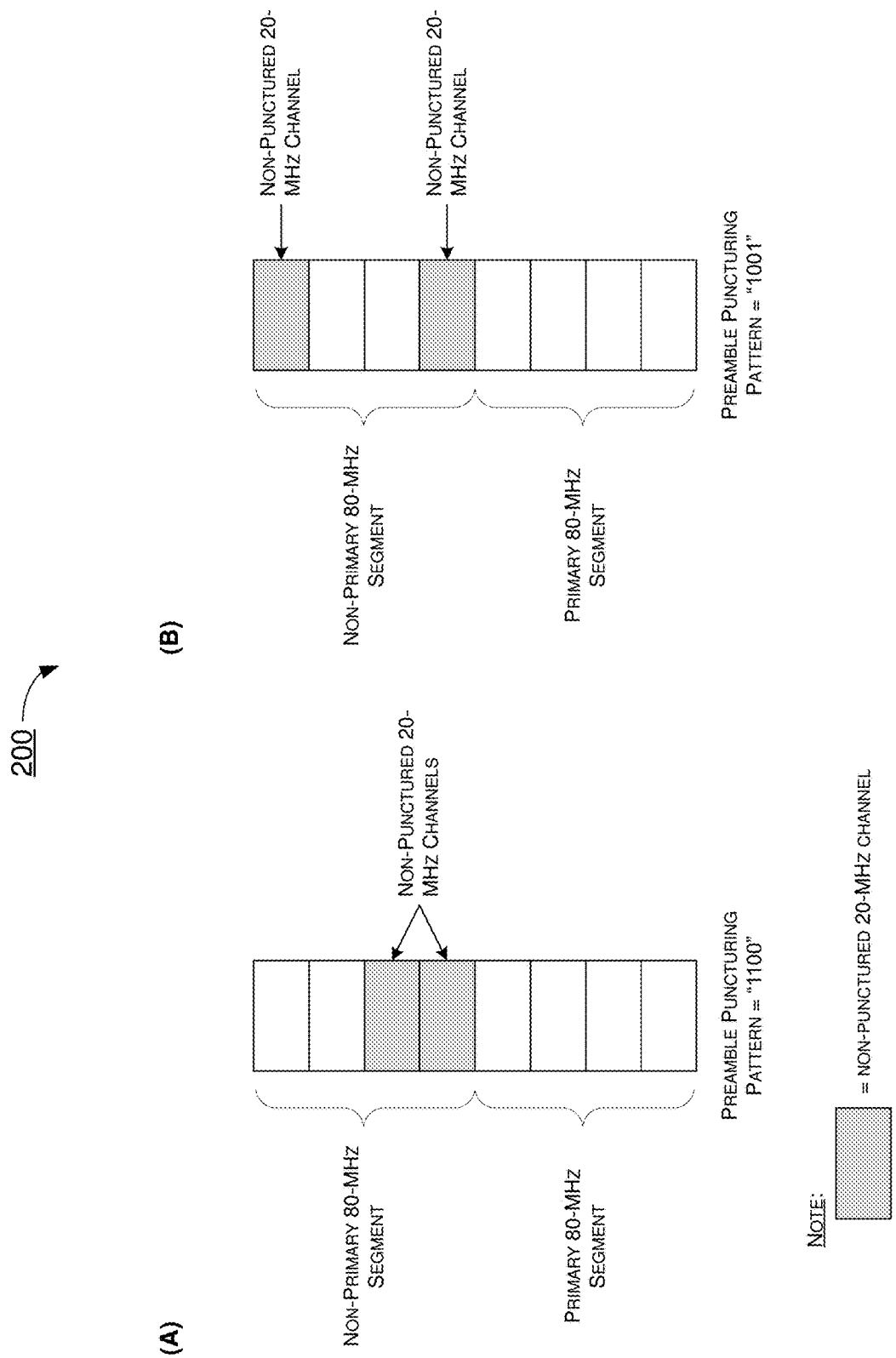
FIG. 2 is a diagram of an example scenario in accordance with the present disclosure.

Under a proposed scheme in accordance with the present disclosure with respect to preamble detection channel selection, an AP (e.g., STA 110 as an AP STA) may announce a preamble puncturing pattern for non-primary channels in a management frame (e.g., beacon, probe response, association response, or other frame(s)), with the preamble puncturing pattern indicating which channels are not punctured during the transmission. FIG. 2 illustrates an example scenario 200 in accordance with the present disclosure. In scenario 200, a bitmap pattern of "1" may be used to indicate which 20-MHz channels in a non-primary 80-MHz segment are not punctured during the transmission. Referring to part (A) of FIG. 2, for a non-primary 80-MHz segment, a bitmap of "1100" indicates the two 20-MHz channels with lower channel numbers are not punctured. Referring to part (B) of FIG. 2, for a non-primary 80-MHz segment, a bitmap of "1001" indicates the first and the last 20-MHz channels ordered in channel number are not punctured.

Under the proposed scheme, the AP may change the preamble puncturing pattern periodically or, alternatively, non-periodically as triggered by one or more predefined events (e.g., detection of radar signal(s), load control, avoidance of reaching a power limit, detection of incumbent devices, and/or interference caused by coexistence of other system(s)). Moreover, under the proposed scheme, the updated indication of preamble puncturing pattern may be carried in a management frame (e.g., beacon, probe response, or other frame(s)).

Figure 3:
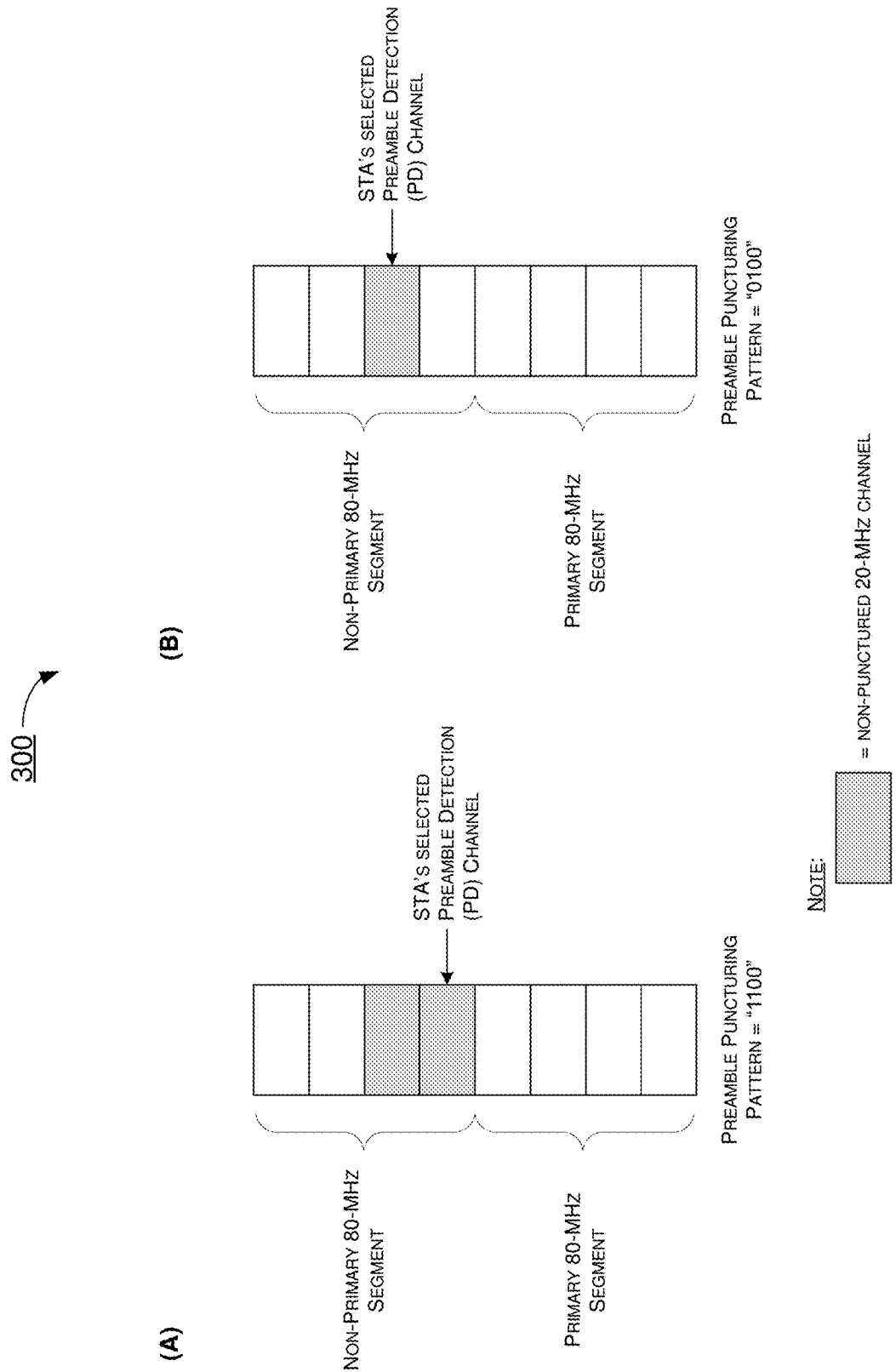
FIG. 3 is a diagram of an example scenario in accordance with the present disclosure.

Under the proposed scheme, a non-AP STA (e.g., STA 120 as a non-AP STA) may request or negotiate the parking segment and preamble puncturing pattern of the non-primary segment through a management frame (e.g., association request/response, parking segment request/response, or the like). The non-AP STA parking in a non-primary 80-MHz segment may select one 20-MHz channel as the preamble detection (PD) channel which is the non-punctured channel indicated in the preamble puncturing pattern to perform preamble detection. The non-AP STA parking in the non-primary 80-MHz may also periodically switch back to the primary 20-MHz channel to receive the updated preamble puncturing pattern of the parked non-primary 80-MHz segment and other non-primary 80-MHz segment through management frames (e.g., beacon, probe response, parking segment switching request/response, or other management frame(s)). FIG. 3 illustrates an example scenario 300 in accordance with the present disclosure. In part (A) of FIG. 3, in the non-primary 80-MHz segment with a bitmap of "1100" as the preamble puncturing pattern, the non-AP STA may select one of the two non-punctured 20-MHz channels as the PD channel. In part (B) of FIG. 3, in the non-primary 80-MHz segment with a bitmap of "0100" as the preamble puncturing pattern, the non-AP STA may select the only one non-punctured 20-MHz channel as the PD channel.

Under a proposed scheme in accordance with the present disclosure with respect to transmission with preamble puncturing, an AP (e.g., STA 110) may transmit in a non-primary 80-MHz segment in an event that all 20-MHz channels indicated as being non-punctured in the preamble puncturing pattern for the non-primary 80-MHz segment are clear channel assessment (CCA) idle. Other 20-MHz channels which are not indicated as non-punctured in the preamble puncturing pattern for that non-primary 80-MHz segment may be punctured in case CCA status is busy. The AP may not transmit on that non-primary 80-MHz segment in an event that at least one 20-MHz channel indicated as being non-punctured in the preamble puncturing pattern for the non-primary 80-MHz segment is CCA busy.

Figure 4:
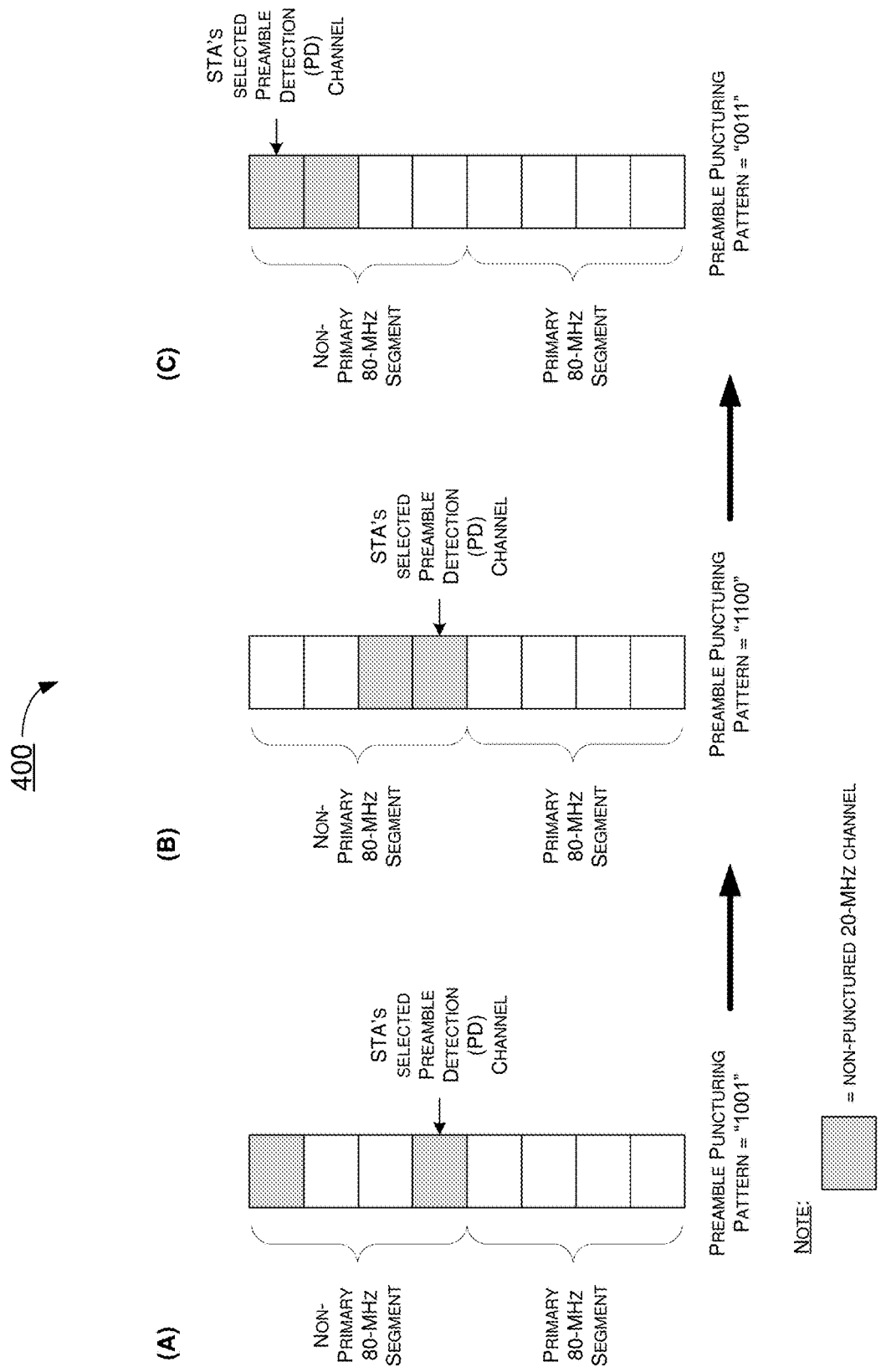
FIG. 4 is a diagram of an example scenario in accordance with the present disclosure.

Under a proposed scheme in accordance with the present disclosure with respect to preamble detection channel switching, a non-AP STA (e.g., STA 120) parked on a non-primary 80-MHz segment may perform PD channel switching when the preamble puncturing pattern of the non-primary 80-MHz segment is updated and the current PD channel is not overlapped with the updated non-punctured channel pattern. Otherwise, in an event that the current PD channel is overlapped with the updated non-punctured channel pattern, the non-AP STA may not perform PD channel switching (as there is no need to do so). FIG. 4 illustrates an example scenario 400 in accordance with the present disclosure. Referring to part (A) of FIG. 4, the PD channel of the non-AP STA is indicated, when the bitmap of preamble puncturing pattern is "1001". Referring to part (B) of FIG. 4, when the preamble puncturing pattern is changed from "1001" to "1100", the non-AP STA may keep the current PD channel since the current PD channel is overlapped with the updated non-punctured channel pattern. Referring to part (C) of FIG. 4, when the preamble puncturing pattern is further changed from "1100" to "0011", the non-AP STA may switch its PD channel to a different channel that is not punctured according to the new preamble puncturing pattern.

Figure 5:
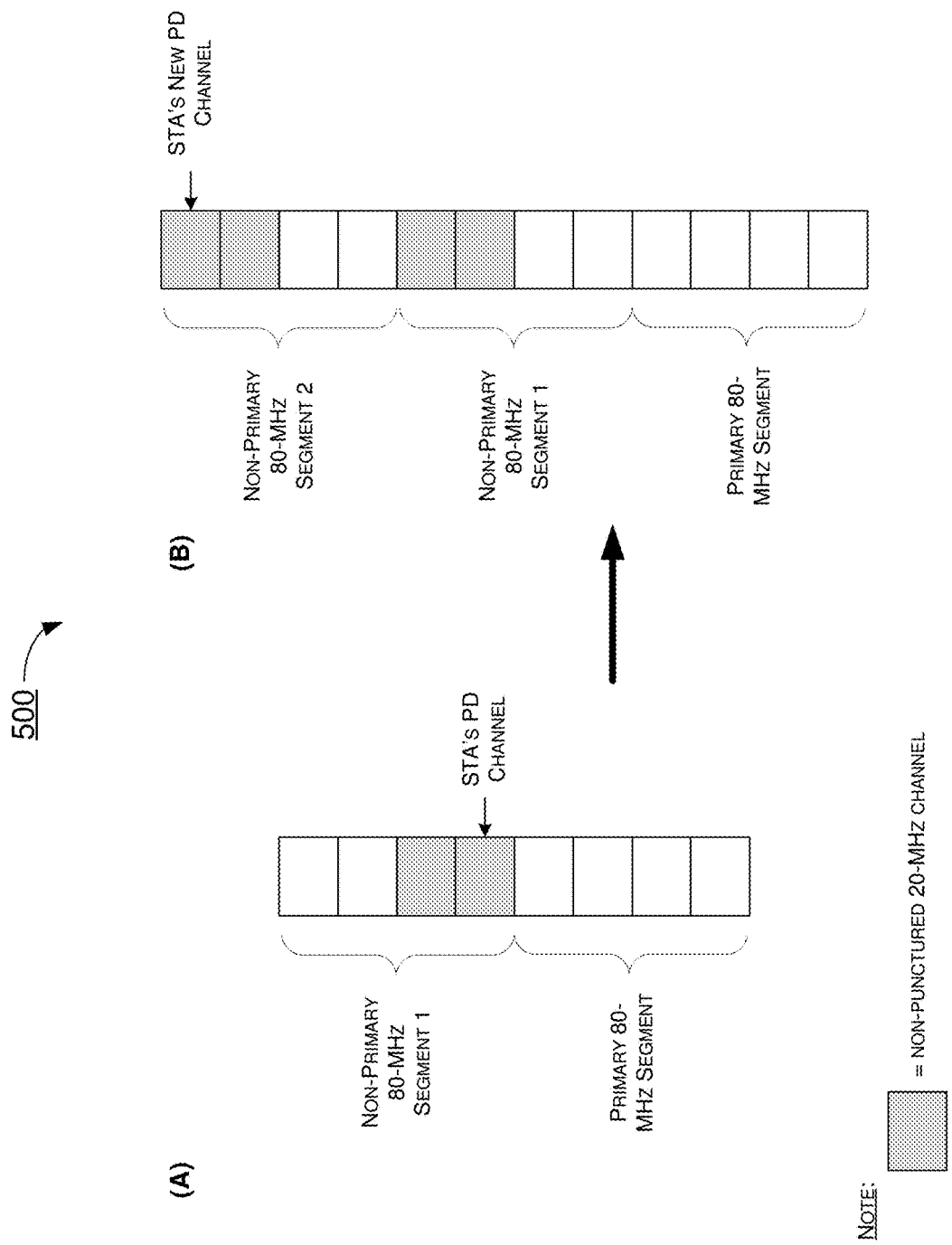
FIG. 5 is a diagram of an example scenario in accordance with the present disclosure.

Under the proposed scheme, a non-AP STA parked on a non-primary 80-MHz segment may switch its PD channel and parking segment through a management frame (e.g., parking segment switching announcement, parking segment switching request/response exchange, or other frame(s)) when one or more of a number of predefined conditions are met. Such predefined conditions may include, for example and without limitation: (a) when the preamble puncturing pattern of the non-primary 80-MHz segment is updated; (b) when the non-AP STA does not detect any preamble from its AP on the PD channel in the parked non-primary 80-MHz segment for a timeout period; and (c) when the non-AP STA is subject to a strong interference (e.g., higher than an interference threshold) in the current parked non-primary 80-MHz segment. Under the proposed scheme, the parking switching announcement or request/response frame may indicate the segment number and target switch time. FIG. 5 illustrates an example scenario 500 in accordance with the present disclosure. Referring to part (A) of FIG. 5, initially the PD channel of a non-AP STA may be one of the non-punctured channels of a first non-primary 80-MHz segment (denoted as "non-primary 80-MHz segment 1" in FIG. 5) before PD channel switching. Referring to part (B) of FIG. 5, the new PD channel of the non-AP STA may be switched to one of the non-punctured channels of a second non-primary 80-MHz segment (denoted as "non-primary 80-MHz segment 2" in FIG. 5) after PD channel switching. In this example, the non-AP STA changes not only its PD channel but also its parking segment (in which the new PD channel is located).

Figure 6:
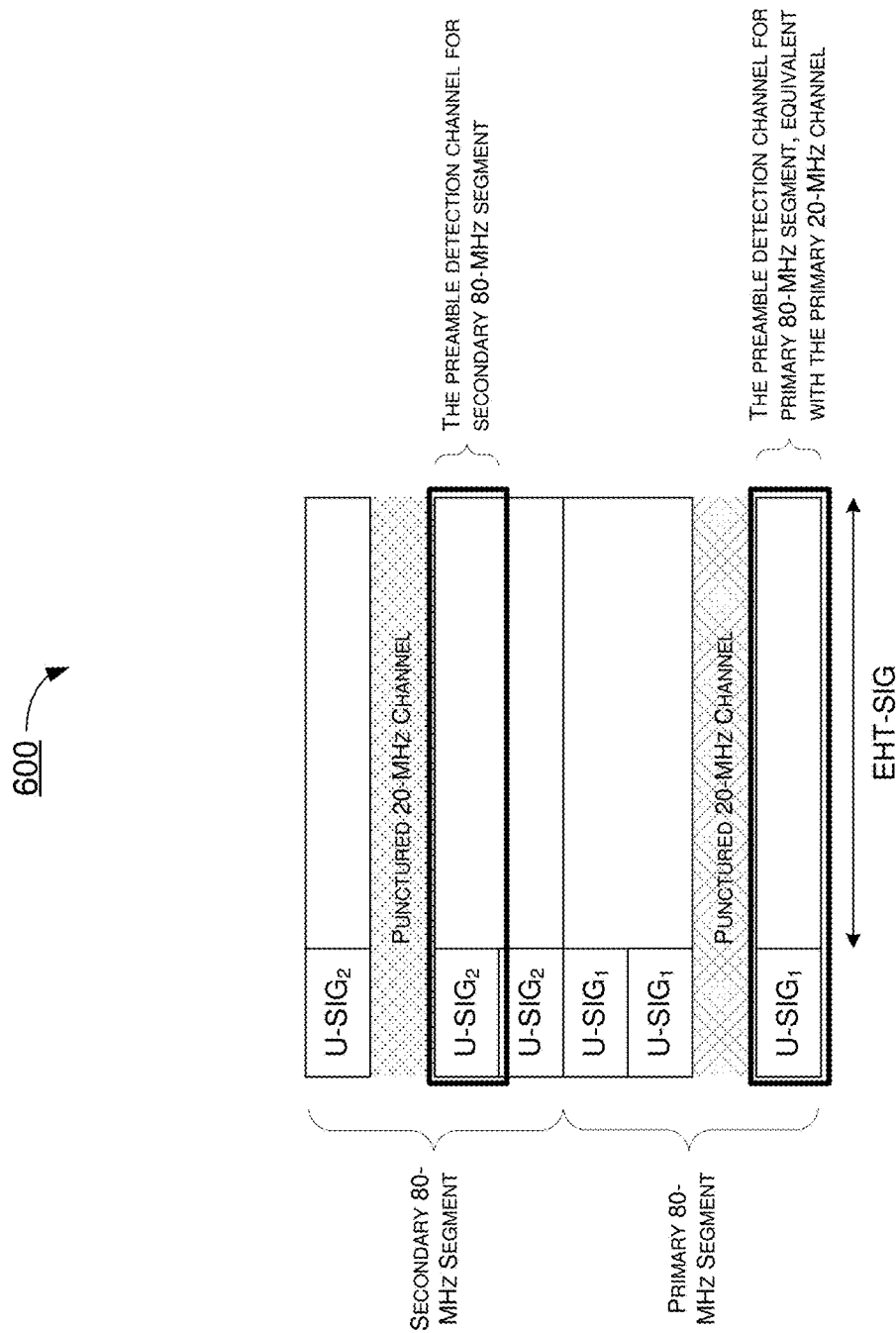
FIG. 6 is a diagram of an example scenario in accordance with the present disclosure.

Under a proposed scheme in accordance with the present disclosure with respect to preamble puncturing support in EHT basic service set (BSS), when punctured channel information carried in U-SIG sent in a 80-MHz segment is specific to only that 80-MHz segment, an AP (e.g., STA 110) may determine a preamble detection channel for each 80-MHz segment and announce the preamble detection channel(s) to its associated STAs. Given that the punctured channel information carried in U-SIG in each 80-MHz segment is specific to only that 80-MHz segment, at least one 20-MHz channel that cannot be punctured in each 80-MHz segment and thus such 20-MHz channel may be determined to be the PD channel for that 80-MHz segment. FIG. 6 illustrates an example scenario 600 in accordance with the present disclosure. In scenario 600, in each of a primary 80-MHz segment and a secondary 80-MHz segment, one of the 20-MHz channels serves as the respective PD channel. Moreover, in the primary 80-MHz segment, the PD channel may also be the primary 20-MHz channel.

Under the proposed scheme, the AP may announce the PD channel for each 80-MHz segment (e.g., in a beacon, probe response, association (or re-association) response frame(s) or other management frame(s)). Additionally, the AP may switch the PD channel for each 80-MHz segment (e.g., in an extended channel switching Announcement frame or parking segment switching announcement/request/response frame or other management frame) by appending the preamble detection channel switch element. A value of the preamble detection switch element may indicate the channel position (e.g., with 0 indicating the lowest 20-MHz channel, 1 indicating the second lowest 20-MHz channel, 2 indicating the third lowest 20-MHz channel, and 3 indicating the fourth lowest 20-MHz channel) of the PD channel for each 80-MHz segment. FIG. 7 illustrates an example scenario 700 in accordance with the present disclosure. In scenario 700, a preamble detection channel switch element is appended to the announcement frame or management frame that is announced by the AP.

In static preamble puncturing, a PD channel may not be utilized in case the PD channel is not idle even though other 60-MHz channels in the 80-MHz segment are idle. Under a proposed scheme in accordance with the present disclosure with respect to dynamic preamble puncturing support in EHT BSS, in order to support dynamic preamble puncturing to adapt to dynamic interference on some 20-MHz channels, an AP may announce a PD channel set for each non-primary segment in management frame (e.g., beacon, probe response, (re)association response, or other frame(s)), with a PD channel set being used by devices parking on a specific non-primary segment to select a PD channel for preamble detection.

Under the proposed scheme, the position of each PD channel (e.g., 20-MHz channel) in the PD channel set in a non-primary segment (e.g., non-primary 80-MHz segment) may be indicated using a PD channel set bitmap. FIG. 8 illustrates an example scenario 800 in accordance with the present disclosure. In scenario 800, each "0" in the bitmap may represent the punctured (and hence disallowed) channel. For example, "1111" may indicate that all four 20-MHz channels in a non-primary 80-MHz segment are in the PD channel set. As another example, "1001" may indicate that the first and the fourth 20-MHz channels in a non-primary 80-MHz segment are in the PD channel set. As yet another example, "0000" may indicate that there is no PD channel in a non-primary 80-MHz segment. The PD channel set information may be carried in a PD channel set element. The PD channel set information may include, for example and without limitation, PD channel set number, PD channel set bitmap, change count, and so on, as shown in FIG. 8.

Figure 9:
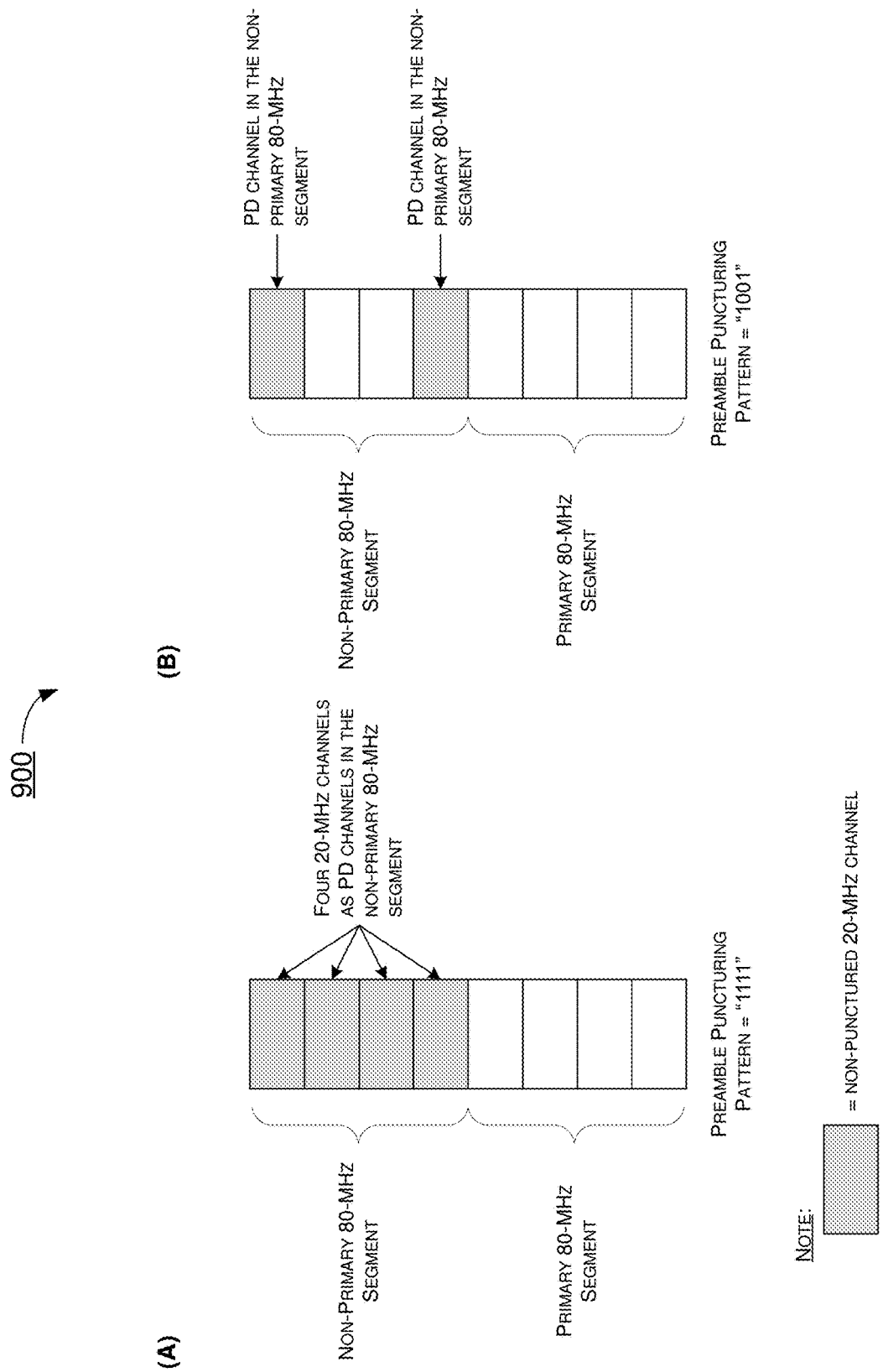
FIG. 9 is a diagram of an example scenario in accordance with the present disclosure.

FIG. 9 illustrates an example scenario 900 in accordance with the present disclosure. Scenario 900 shows an example regarding usage of PD channel set for dynamic preamble puncturing support in EHT BSS. Referring to part (A) of FIG. 9, a bitmap pattern of "1111" may indicate that all four 20-MHz channels in a 80-MHz segment are used for preamble detection. Referring to part (B) of FIG. 9, a bitmap pattern of "1001" may indicate that the 20-MHz channels corresponding to "1" in the 80-MHz segment can be used for preamble detection.

Under a proposed scheme in accordance with the present disclosure with respect to PD channel set update, the AP may update the PD channel set periodically or, alternatively, non-periodically as triggered by one or more of a number of predefined events in a management frame (e.g., beacon, probe response, (re)association response, or other frame(s)). The predefined events may include, for example and without limitation, detection of radar signal(s), load control, avoidance of reaching a power limit, detection of incumbent devices, and/or interference caused by coexistence of other system(s). By default, the AP may configure all 20-MHz channels as PD channels in each non-primary 80-MHz segment without signaling. As such, in an event that the AP does not include any PD channel set information in management frames, the default PD channel set may be used.

Under a proposed scheme in accordance with the present disclosure with respect to PD channel allocation or selection for non-AP STAs, when a non-AP STA (e.g., STA 120) decides to park on a non-primary 80-MHz segment, the non-AP STA may be allocated or select one PD channel from the PD channel set. Under the proposed scheme, the allocated/selected PD channel for a non-AP STA may be determined by a certain rule. For instance, the remainder of the mathematical operation x mod y may first be obtained, with x being the association identifier (AID) of a non-AP STA and with y being the number of channels in the PD channel set in a non-primary 80-MHz segment. Then, the remainder may be used to allocate the PD channel from the PD channel set for the non-AP STA. As an example, with the number of channels in the PD channel set being 2, the first channel (e.g., the one with the lowest channel number) would be chosen as the PD channel when the remainder=0 from the mathematical operation of x mod y. Similarly, the second channel would be chosen as the PD channel when the remainder=1 from the mathematical operation of x mod y.

Under the proposed scheme, the allocated/selected PD channel for a non-AP STA may also be negotiated by <AID, PD channel> pair through management frames (e.g., (re)association request/response, PD channel request/response, and so on). Afterwards, the allocated/selected PD channel may be indicated in a broadcast by the AP.

Figure 10:
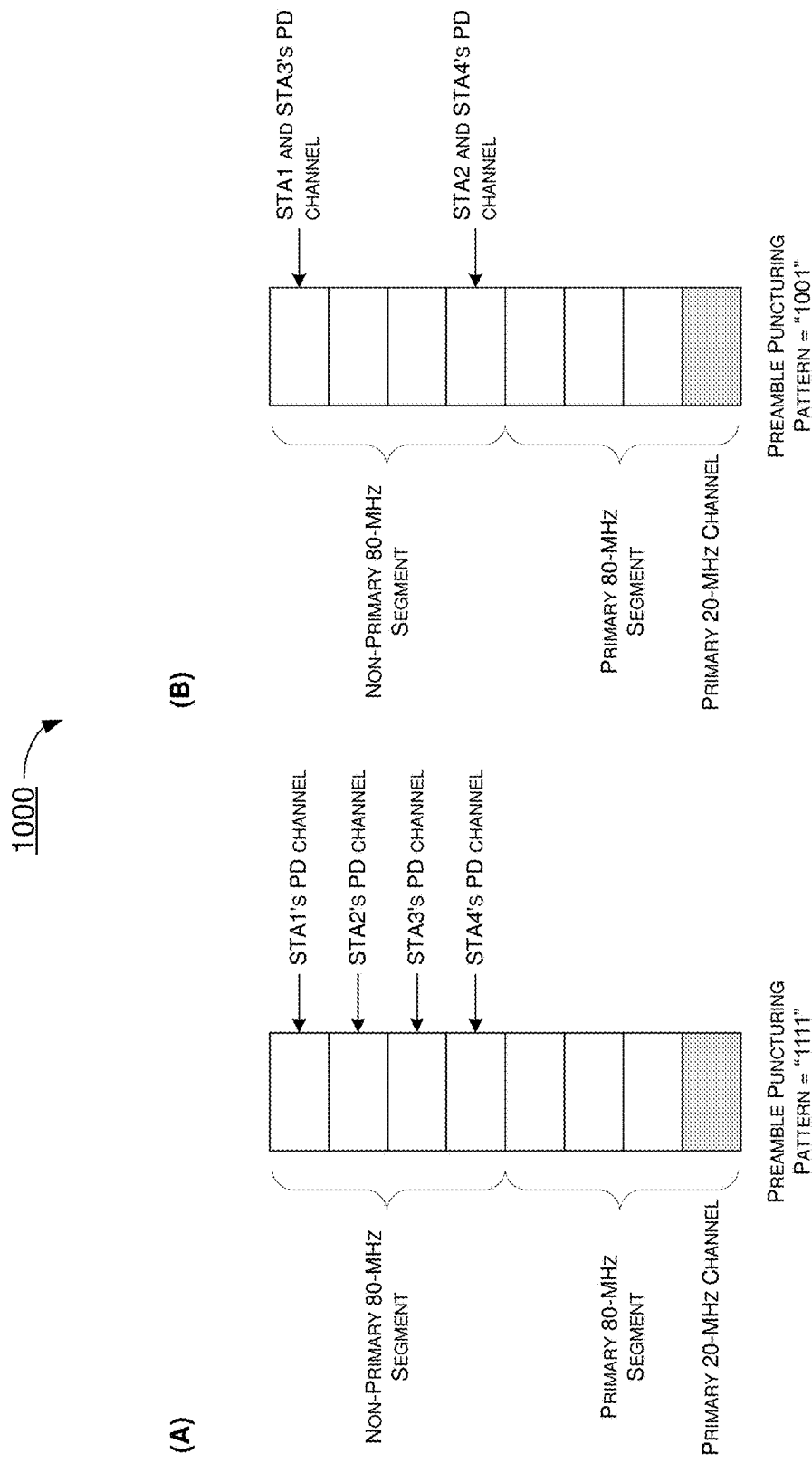
FIG. 10 is a diagram of an example scenario in accordance with the present disclosure.

Under the proposed scheme, multiple non-AP STAs parking on the same non-primary 80-MHz segment may be allocated to or may select different PD channels in order to spread usage of the PD channel set in the non-primary 80-MHz segment. FIG. 10 illustrates an example scenario 1000 in accordance with the present disclosure. Scenario 1000 shows an example regarding allocation/selection of PD over a PD channel set for dynamic preamble puncturing support in EHT BSS. Referring to part (A) of FIG. 10, with a bitmap pattern of "1111" indicating that all four 20-MHz channels in the non-primary 80-MHz segment are available for preamble detection, each of four STAs (e.g., STA1, STA2, STA3 and STA4) may be allocated to or may select a respective one of the four 20-MHz channels as its respective PD channel. Referring to part (B) of FIG. 10, with a bitmap pattern of "1001" indicating that the 20-MHz channels corresponding to "1" in the non-primary 80-MHz segment are available for preamble detection, two of the STAs may be allocated to or may select a respective one of the two available 20-MHz channels as their respective PD channel. In the example shown in part (B) of FIG. 10, STA1 and STA3 are allocated to one of the two available 20-MHz channels while STA2 and STA4 are allocated to the other 20-MHz channel.

Under a proposed scheme in accordance with the present disclosure with respect to preamble puncturing support for wide-bandwidth transmissions in EHT, an AP (e.g., STA 110) supporting wide operating bandwidths (e.g., 320 MHz) may transmit in the primary 80-MHz segment and one or more non-primary 80-MHz segment(s). Under the proposed scheme, the AP may transmit on a non-primary 80-MHz segment in case that at least one PD channel in the PD channel set for the non-primary segment is CCA idle. On the other hand, the AP may not transmit on a non-primary 80-MHz segment in case that all PD channels in the PD channel set for the non-primary segment are CCA busy. Under the proposed scheme, the AP may transmit downlink (DL) frame(s) or may trigger uplink (UL) transmission(s) for a non-AP STA (e.g., STA 120) whose allocated/selected PD channel is not punctured. On the other hand, the AP may not transmit DL frame(s) or trigger UL transmission(s) for a non-AP STA whose allocated/selected PD channel is punctured.

Figure 11:
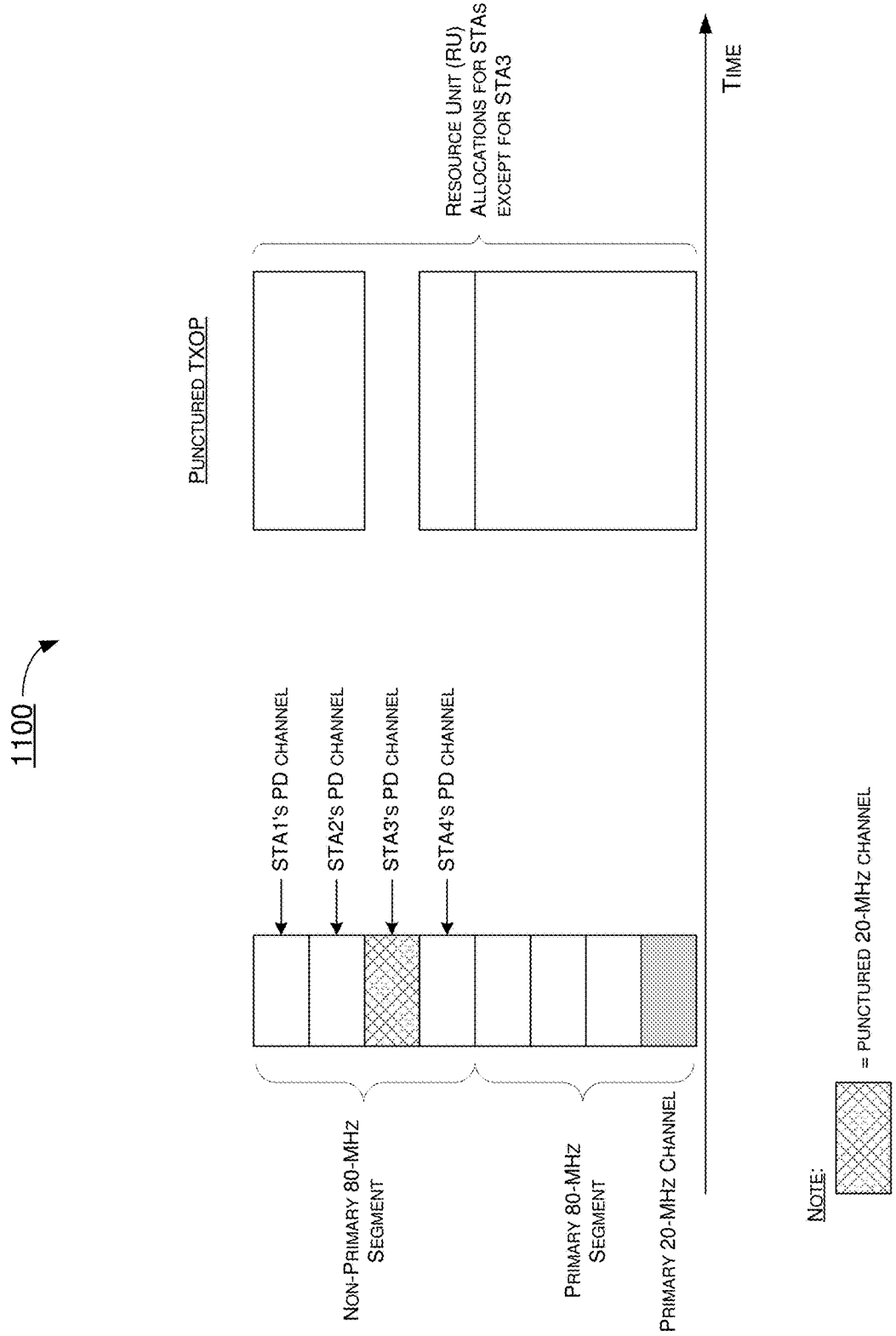
FIG. 11 is a diagram of an example scenario in accordance with the present disclosure.

FIG. 11 illustrates an example scenario 1100 in accordance with the present disclosure. Specifically, scenario 1100 shows an example of punctured TXOP. In scenario 1100, an AP obtains a TXOP with preamble puncturing some of the non-primary channels. Specifically, in scenario 1100, all four 20-MHz channels of a non-primary 80-MHz segment are PD channels. Four STAs, including STA1, STA2, STA3 and STA4, are parked on the non-primary 80-MHz segment and each selects a respective one of the four 20-MHz channels in the non-primary 80-MHz segment as its PD channel. When STA3's PD channel is punctured and when the AP obtains a punctured TXOP, the AP would transmit to STA1, STA2 and STA4 except for STA3.

Under a proposed scheme in accordance with the present disclosure with respect to preamble puncturing support for PD channel switching in EHT, a non-AP STA (e.g., STA 120) may monitor its PD channel to detect transmission(s) in the non-primary 80-MHz segment. The non-AP STA may also monitor or request for an update of PD channel set for a non-primary segment (e.g., via beacon, probe response, (re)association request/response, PD channel switching request/response, and the like). The non-AP STA may switch its PD channel based on the updated PD channel set, if and when an update is received. Under the proposed scheme, under certain circumstances, the non-AP STA may switch back to the primary 20-MHz channel to update its PD channel by PD channel switching request or monitoring beacon (or other frame(s)) indicating the update of PD channel set (e.g., so that non-AP STAs may switch back to the primary 20-MHz channel to update their respective PD channel by monitoring beacon(s)) in which AP indicates the update of PD channel set). For instance, the non-AP STA may switch back to the primary 20-MHz channel to update its PD channel in case that: (a) the non-AP STA does not detect any preamble from its associated AP on the allocated/selected PD channel for a timeout period, and/or (b) in case that the non-AP STA experiences strong interference (e.g., higher than an interference threshold) in its current PD channel. Moreover, PD channel switching may be signaled with <AID, PD channel> pair based on the current or updated PD channel set.

Under the proposed scheme, the PD channel(s) in each non-primary 80-MHz segment may also be dynamically switched in each TXOP by exchanging EHT (multiuser (MU)-)/request-to-send (RTS)/clear-to-send (CTS) frame(s) before sending the preamble punctured Physical Layer Conformance Procedure (PLCP) Protocol Data Units (PPDUs). Under the proposed scheme, an EHT (MU-) RTS frame may contain the PD channel information for each non-primary 80-MHz segment that indicates the 20-MHz channel(s) which is/are not punctured during the TXOP. A non-AP STA may monitor the primary 20-MHz channel in the primary 80-MHz segment to receive the EHT (MU-) RTS frame, which may indicate resource allocation (e.g., by indicating that the non-primary segment where the resource is allocated to the intended recipient and indicating the PD channel(s)) for that non-primary segment). Accordingly, after receiving the EHT (MU-) RTS frame, the non-AP STA may switch its PD channel from the primary 20-MHz channel to the specific channel indicated in the EHT (MU-) RTS frame during the TXOP.

Figure 12:
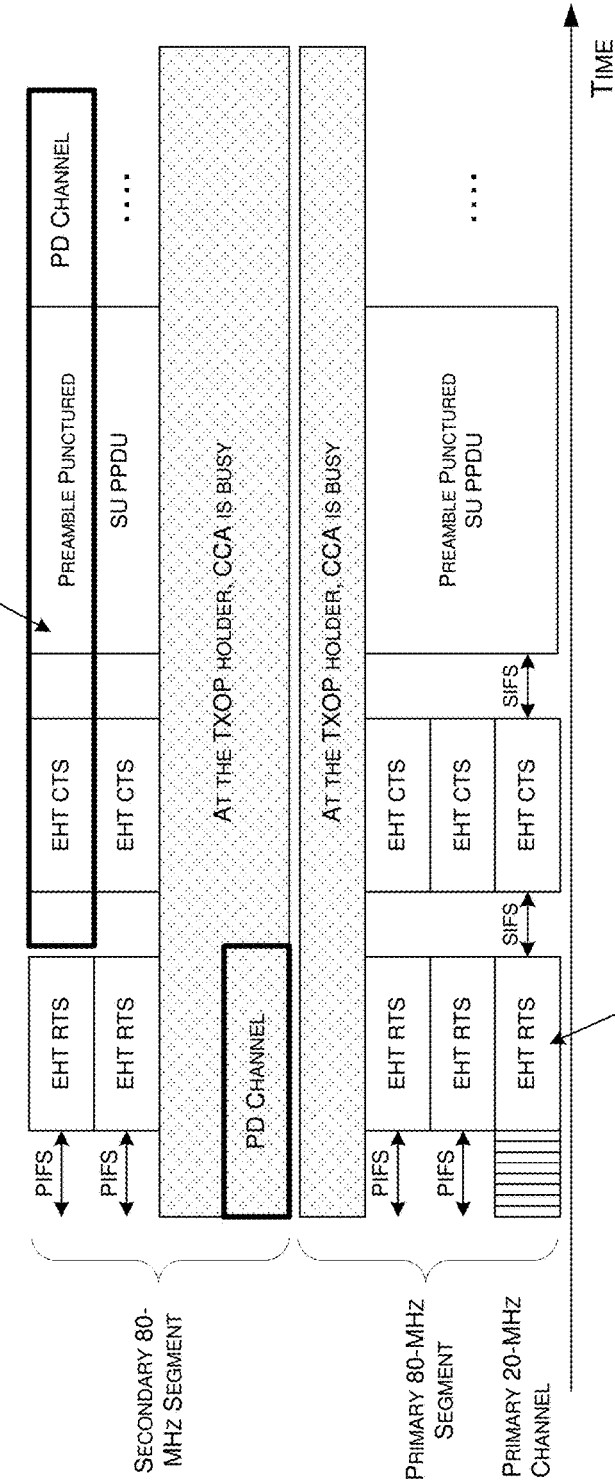
FIG. 12 is a diagram of an example scenario in accordance with the present disclosure.

FIG. 12 illustrates an example scenario 1200 in accordance with the present disclosure. Specifically, scenario 1200 shows an example of dynamic PD channel switching in a TXOP. In scenario 1200, initially, the PD channel of the secondary 80-MHz segment is the lowest 20-MHz channel. However, due to the PD channel of the secondary 80-MHz segment being busy, the TXOP holder (e.g., AP) dynamically switches the PD channel to the fourth lowest 20-MHz channel in the secondary 80-MHz segment by signaling PD channel switch information to indicate such a change in an EHT RTS frame. As for an intended recipient (e.g., a non-AP STA) of the EHT RTS frame, upon decoding the EHT RTS on the primary 20-MHz channel in the primary 80-MHz segment, it may switch to the new PD channel (e.g., the fourth lowest 20-MHz channel in the secondary 80-MHz segment) as indicated in the EHT RTS frame.

Under a proposed scheme in accordance with the present disclosure with respect to CCA reset on a PD channel, a non-AP STA (e.g., STA 120) parking on a non-primary channel (e.g., in a non-primary 80-MHz) may detect preambles on its PD channel. When a detected preamble is an OBSS PPDU, under certain circumstances, a medium access control layer (MAC) entity of the non-AP STA may issue a CCA reset request to its physical layer (PHY) entity (e.g., PHY-CCARESET.request primitive). For instance, the MAC entity of the non-AP STA may issue a CCA reset request to its PHY entity in response to occurrence of one or more of the following: (a) the OBSS PPDU with a received signal strength indication (RSSI) being less than an energy detection threshold, (b) a carrier lost indication (e.g., PHY-RXEND.indication(CarrierLost) primitive) being generated by the PHY entity prior to the end of a given period, and (c) a format violation indication (e.g., PHY-RXEND.indication (FormatViolation) primitive) being generated by the PHY entity prior to the end of this period. After the MAC entity issues the PHY-CCARESET.request primitive to reset the PHY entity to a state appropriate for the end of a received frame (e.g., PPDU) and to initiate a new CCA evaluation cycle, the non-AP STA may be able to detect new preamble(s) on its PD channel to receive PPDU(s) sent by its associated AP.

Under a proposed scheme in accordance with the present disclosure with respect to PD channel switching delay, a non-AP STA (e.g., STA 120) may perform CCA after switching to a new PD channel or a new parking segment until a frame (e.g., PPDU) is detected by which the non-AP STA can set its network allocation vector (NAV) to synchronize with the new PD channel. Under the proposed scheme, after the switching delay, an AP may perform DL transmission(s) to a non-AP STA which is switching to its new PD channel or a new parking segment. Moreover, after the switching delay and/or NAV synchronization delay, the AP may trigger UL transmission(s) to a non-AP STA which is switching to its new PD channel or a new parking segment.

Illustrative Implementations

Figure 13:
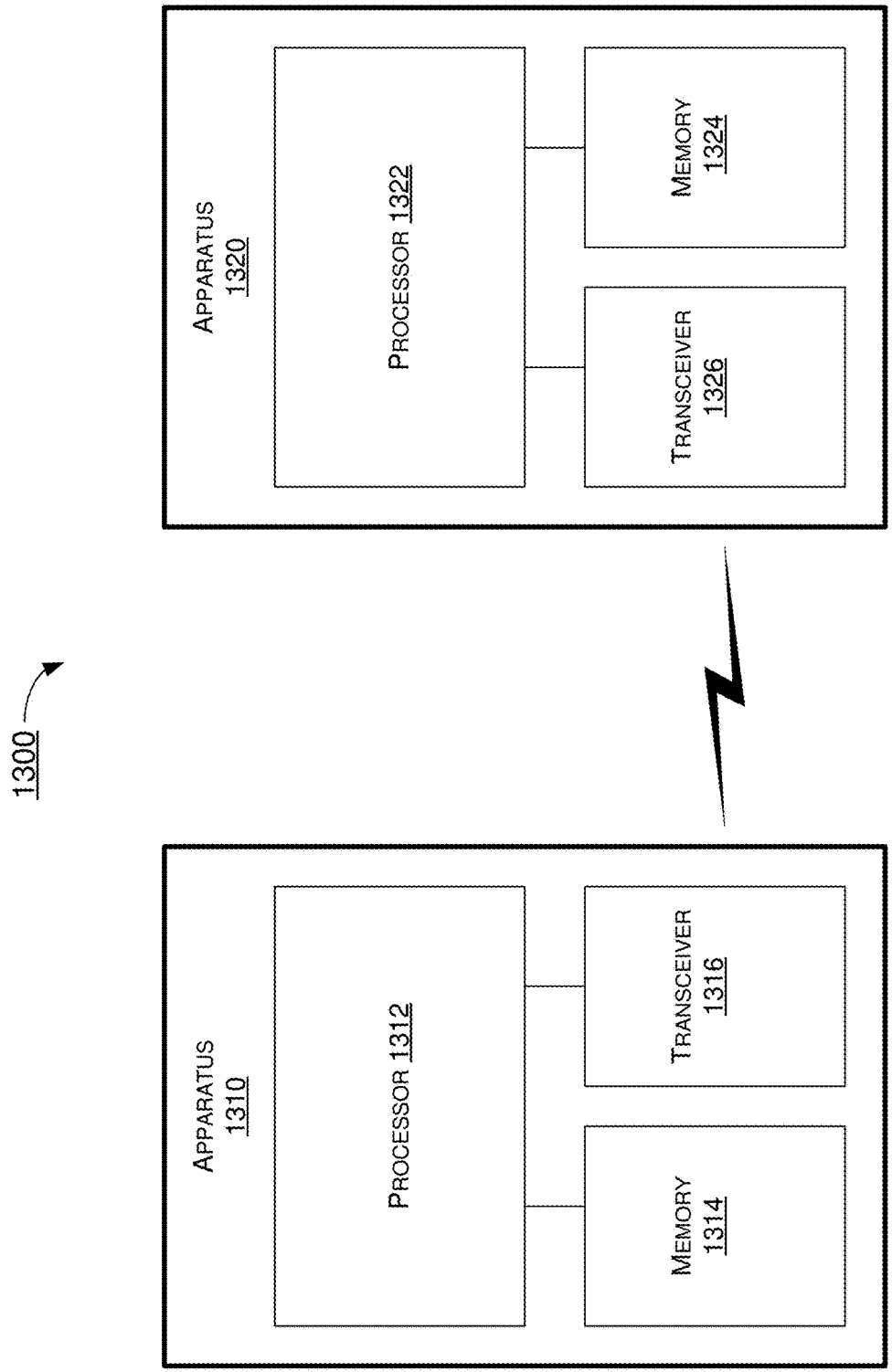
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclosure. Each of apparatus 1310 and apparatus 1320 may perform various functions to implement schemes, techniques, processes and methods described herein pertaining to preamble puncturing support for wide bandwidth transmission in wireless communications, including the various schemes described above with respect to various proposed designs, concepts, schemes, systems and methods described above as well as processes described below. For instance, apparatus 1310 may be implemented in STA 110 and apparatus 1320 may be implemented in STA 120, or vice versa.

Each of apparatus 1310 and apparatus 1320 may be a part of an electronic apparatus, which may be a non-AP STA or an AP STA, such as a portable or mobile apparatus, a wearable apparatus, a wireless communication apparatus or a computing apparatus. When implemented in a non-AP STA, each of apparatus 1310 and apparatus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine type apparatus, which may be an IoT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP in a WLAN.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1310 and apparatus 1320 may be implemented in or as a non-AP STA or an AP STA. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, one or more RISC processors or one or more CISC processors. That is, even though a singular term "a processor" is used herein to refer to processor 1312 and processor 1322, each of processor 1312 and processor 1322 may include multiple processors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1312 and processor 1322 is a special-purpose machine specifically designed, arranged and configured to perform specific tasks including those pertaining to preamble puncturing support for wide bandwidth transmission in wireless communications in accordance with various implementations of the present disclosure.

In some implementations, apparatus 1310 may also include a transceiver 1316 coupled to processor 1312. Transceiver 1316 may include a transmitter capable of wirelessly transmitting and a receiver capable of wirelessly receiving data. In some implementations, apparatus 1320 may also include a transceiver 1326 coupled to processor 1322. Transceiver 1326 may include a transmitter capable of wirelessly transmitting and a receiver capable of wirelessly receiving data.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310, as STA 110 (e.g., an AP STA), and apparatus 1320, as STA 120 (e.g., a non-AP STA), is provided below. It is noteworthy that, although the example implementations described below are provided in the context of WLAN, the same may be implemented in other types of networks.

Under a proposed scheme pertaining to preamble puncturing support for wide bandwidth transmission in wireless communications in accordance with the present disclosure, with apparatus 1310 implemented in or as STA 110 and apparatus 1320 implemented in or as STA 120 in network environment 100 in accordance with one or more of IEEE 802.11 standards, processor 1312 of apparatus 1310 may announce, via transceiver 1316, to one or more STAs (e.g., including apparatus 1320 as a STA) in a frame (e.g., a management frame) one or more PD channels in a frequency segment (e.g., one or more channels that are not punctured during a TXOP) such that each of the one or more STAs monitors a respective one of the one or more PD channels to detect any transmission on the one or more PD channels. Additionally, processor 1312 may wirelessly communicate, via transceiver 1316, with at least one of the one or more STAs on one of the one or more PD channels during the TXOP.

In some implementations, in announcing the one or more PD channels, processor 1312 may announce a preamble puncturing pattern indicating, in each of one or more non-primary frequency segments, one or more channels that are not punctured during the TXOP such that each of the one or more STAs monitors one of the one or more channels in one of the one or more non-primary frequency segments as a respective PD channel to detect any transmission on the respective PD channel. Alternatively, in announcing the one or more PD channels, processor 1312 may announce a PD channel set indicating, in each of one or more non-primary frequency segments, one or more channels that are dedicated for the one or more STAs during the TXOP such that each of the one or more STAs monitors one of the one or more channels in one of the one or more non-primary frequency segments as the respective PD channel to detect any transmission on the respective PD channel.

In some implementations, the one or more non-primary frequency segments may include one or more non-primary 80-MHz frequency segments not including a 20-MHz primary channel on which channel access is performed. In such cases, in wirelessly communicating with the at least one of the one or more STAs, processor 1312 may perform one or more of the following: (a) transmitting on one of the one or more non-primary 80-MHz frequency segments in an event that at least one PD channel in the PD channel set for the one of the one or more non-primary 80-MHz frequency segments is CCA idle; (b) not transmitting on the one of the one or more non-primary 80-MHz frequency segments in an event that all PD channels in the PD channel set for the one of the one or more non-primary 80-MHz frequency segments are CCA busy; (c) transmitting a DL frame to the at least one of the one or more STAs or triggering an UL transmission from the at least one of the one or more STAs in an event that the PD channel of the at least one of the one or more STAs is not punctured; and (d) not transmitting the DL frame to the at least one of the one or more STAs or triggering the UL transmission from the at least one of the one or more STAs in an event that the PD channel of the at least one of the one or more STAs is punctured.

In some implementations, the frequency segment may include a non-primary 80-MHz frequency segment which does not include a 20-MHz primary channel on which channel access is performed. In such cases, in wirelessly communicating with the at least one of the one or more STAs, processor 1312 may transmit on the frequency segment in an event that all of a plurality of 20-MHz channels in the frequency segment, which are indicated as being not punctured in the preamble puncturing pattern, are CCA idle. In some cases, in wirelessly communicating with the at least one of the one or more STAs, processor 1312 may transmit on the frequency segment in an event that at least one of a plurality of 20-MHz channels in the frequency segment, which is indicated as being not punctured in the preamble puncturing pattern, is CCA idle. Alternatively, in wirelessly communicating with the at least one of the one or more STAs, processor 1312 may not transmit on the frequency in an event that at least one of the plurality of 20-MHz channels in the frequency segment, which is indicated as being not punctured in the preamble puncturing pattern, is CCA busy.

In some implementations, the frequency segment may include a non-primary 80-MHz frequency segment which does not include a 20-MHz primary channel on which channel access is performed. Moreover, the management frame may include a beacon, a probe response, an association response, or a re-association response. In some implementations, in announcing the one or more PD channels, processor 1312 may exchange control frames (e.g., EHT RTS and CTS frames) at a beginning of the TXOP with the one or more STAs to dynamically update the one or more PD channels in the frequency segment for the TXOP. In such cases, in wireless communicating, processor 1312 may transmit one or more preamble punctured PPDUs to the one or more STAs.

In some implementations, in wirelessly communicating with the at least one of the one or more STAs, processor 1312 may perform at least one of the following operations: (a) performing a DL transmission to the at least one of the one or more STAs after the at least one of the one or more STAs switching to a different PD channel in a same or a different frequency segment; and (b) triggering an UL transmission from the at least one of the one or more STAs after the at least one of the one or more STAs switching to the different PD channel in the same or the different frequency segment.

In some implementations, processor 1312 may perform additional operations. For instance, processor 1312 may update the preamble puncturing pattern to a new preamble puncturing pattern indicating one or more different channels in the frequency segment that are not punctured during a subsequent transmission. Moreover, processor 1312 may transmit, on a primary channel on which channel access is performed, an update indicating the new preamble puncturing pattern.

In some implementations, in updating the preamble puncturing pattern, processor 1312 may update the preamble puncturing pattern periodically. Alternatively, processor 1312 may update the preamble puncturing pattern non-periodically as triggered by one or more of detection of a radar signal, load control, avoidance of reaching a power limit, detection of one or more incumbent devices, and interference caused by coexistence of one or more other system.

Under another proposed scheme pertaining to preamble puncturing support for wide bandwidth transmission in wireless communications in accordance with the present disclosure, with apparatus 1310 implemented in or as STA 110 and apparatus 1320 implemented in or as STA 120 in network environment 100 in accordance with one or more of IEEE 802.11 standards, processor 1322 of apparatus 1320 may receive, via transceiver 1326, from an AP (e.g., apparatus 1310) a frame (e.g., a management frame) announcing one or more PD channels in a frequency segment (e.g., one or more channels that are not punctured during a transmission). Additionally, processor 1322 may determine one of the one or more PD channels as a PD channel. Moreover, processor 1322 may monitor the PD channel to detect a transmission on the PD channel.

In some implementations, in receiving the frame announcing the one or more PD channels, processor 1322 may receive a preamble puncturing pattern indicating, in each of one or more non-primary frequency segments, one or more channels that are not punctured during a TXOP such that each of one or more STAs to which the frame is transmitted monitors one of the one or more channels in one of the one or more non-primary frequency segments as a respective PD channel to detect any transmission on the respective PD channel. Alternatively, in receiving the frame announcing the one or more PD channels, processor 1322 may receive a PD channel set indicating, in each of the one or more non-primary frequency segments, one or more channels that are dedicated for the one or more STAs during the TXOP such that each of the one or more STAs monitors one of the one or more channels in one of the one or more non-primary frequency segments as the respective PD channel to detect any transmission on the respective PD channel.

In some implementations, the one or more non-primary frequency segments may include one or more non-primary 80-MHz frequency segments not including a 20-MHz primary channel on which channel access is performed.

In some implementations, the frequency segment may include a non-primary 80-MHz frequency segment which does not include a 20-MHz primary channel on which channel access is performed. Moreover, the frame may include a beacon, a probe response, an association response, or a re-association response.

In some implementations, processor 1322 may perform additionally operations. For instance, processor 1322 may receive, from the AP, an update indicating a new preamble puncturing pattern indicating one or more different channels in the frequency segment that are not punctured during a subsequent transmission. Moreover, responsive to receiving the update, processor 1322 may switch to one of the one or more different channels as a new PD channel to monitor the new PD channel to detect any transmission on the new PD channel.

In some implementations, processor 1322 may perform additionally operations. For instance, processor 1322 may switch to a different frequency segment which does not include a primary channel on which channel access is performed.

In some implementations, in switching, processor 1322 may perform additional operations. For instance, processor 1322 may receive a frame (e.g., an EHT RTS frame) from the AP at a beginning of a TXOP indicating the different frequency segment where a resource is allocated and a different PD channel in the different frequency segment.

Additionally, processor 1322 may switch to the different PD channel in the different frequency segment responsive to receiving the frame.

In some implementations, processor 1322 may perform other operations. For instance, processor 1322 may transmit, via transceiver 1326, an indication of the switching via a parking segment switching announcement or via a parking segment switching request and response exchange. In such cases, in switching to the different frequency segment, processor 1322 may switch to the different frequency segment responsive to one or more of a plurality of conditions. The plurality of conditions may include: (a) the preamble puncturing pattern having been updated by the AP, (b) no detection of any preamble from the AP on the PD channel for a timeout period, and (c) existence of an interference higher than an interference threshold in the frequency segment.

In some implementations, processor 1322 may perform additionally operations. For instance, processor 1322 may switch back to the primary channel. Additionally, processor 1322 may select the PD channel to a different non-primary channel as a different PD channel. Moreover, processor 1322 may transmit, to the AP and via transceiver 1326, the selected PD channel indicating the selected different PD channel. For instance, non-AP STAs may select a PD channel based on AP-announced non-punctured channel pattern or PD channel set, and each non-AP STA may indicate its selected PD channel to the AP. Alternatively, each non-AP STA may switch to a different PD channel and may indicate the updated PD channel to the AP.

In some implementations, in transmitting the updated PD channel, processor 1322 may transmit the updated PD channel via a PD channel switching request. Moreover, in updating the PD channel, processor 1322 may update the PD channel responsive to at least one of the following: (a) no detection of any preamble from the AP on the PD channel for a timeout period, and (b) existence of an interference higher than an interference threshold in the PD channel.

In some implementations, processor 1322 may perform additionally operations. For instance, processor 1322 may detect, on the PD channel, a preamble of an OBSS PPDU. Moreover, a MAC of processor 1322 may issue a CCA reset request to a PHY of apparatus 1320 responsive to at least one of a plurality of conditions being met. In some implementations, the plurality of conditions may include the following: (a) the OBSS PPDU having a RSSI being less than an energy detection threshold, (b) a carrier lost indication being generated by the PHY prior to an end of a given period, and (c) a format violation indication being generated by the PHY prior to the end of the given period.

In some implementations, processor 1322 may perform additionally operations. For instance, processor 1322 may switch to a different PD channel or a different frequency segment. Furthermore, processor 1322 may perform at least one of the following: (a) receiving a DL transmission from the AP after a switching delay upon the switching to the different PD channel or the different frequency segment; and (b) performing an UL transmission to the AP after the switching delay or a NAV synchronization delay upon switching to the different PD channel or the different frequency segment.

Illustrative Processes

Figure 14:
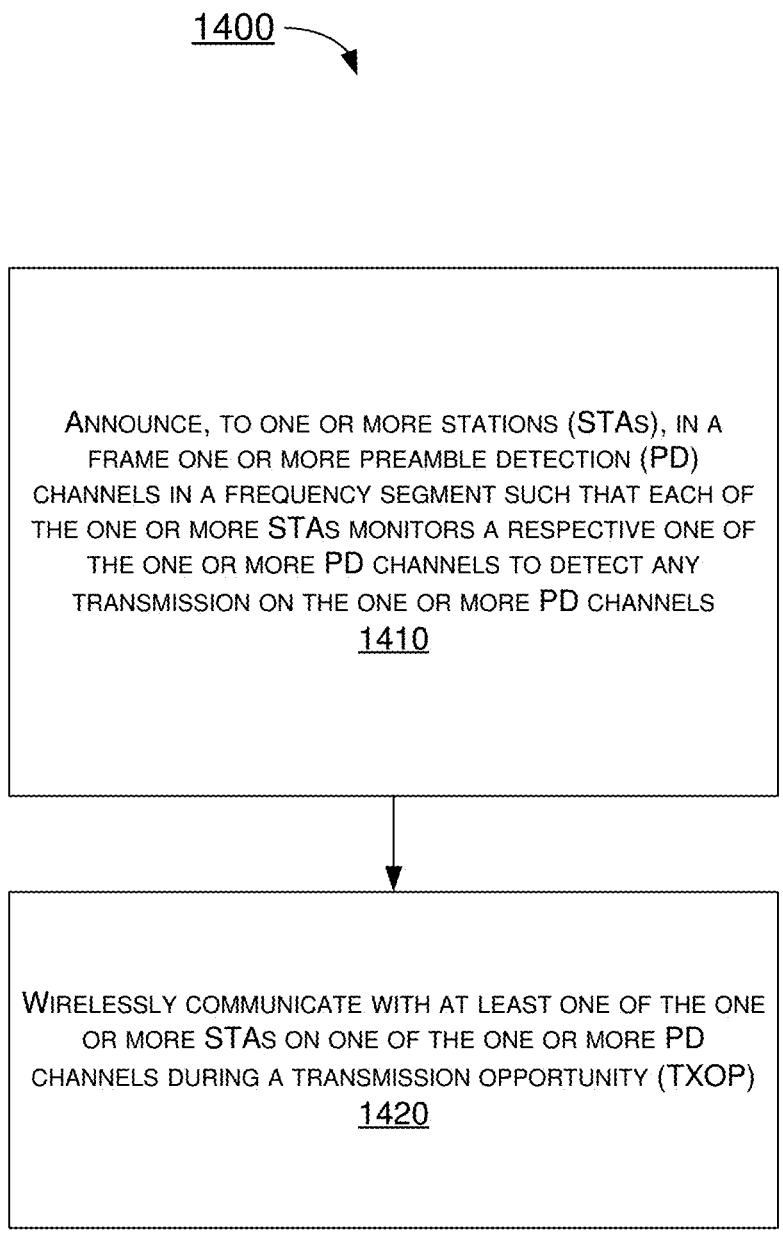
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to preamble puncturing support for wide bandwidth transmission in wireless communications in wireless communications in accordance with the present disclosure. Process 1400 may include one or more operations, actions, or functions as illustrated by one or more of blocks 1410 and 1420. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in apparatus 1310 and apparatus 1320 as well as any variations thereof. Solely for illustrative purposes and without limiting the scope, process 1400 is described below in the context of apparatus 1310 implemented in or as STA 110 (e.g., AP STA) and apparatus 1320 implemented in or as STA 120 (e.g., non-AP STA) of a wireless network such as a WLAN in network environment 100 in accordance with one or more of IEEE 802.11 standards. Process 1400 may begin at block 1410.

At 1410, process 1400 may involve processor 1312 of apparatus 1310 announcing, via transceiver 1316, to one or more STAs (e.g., including apparatus 1320 as a STA) in a frame (e.g., a management frame) one or more PD channels in a frequency segment (e.g., one or more channels that are not punctured during a TXOP) such that each of the one or more STAs monitors a respective one of the one or more PD channels to detect any transmission on the one or more PD channels. Process 1400 may proceed from 1410 to 1420.

At 1420, process 1400 may involve processor 1312 wirelessly communicating, via transceiver 1316, with at least one of the one or more STAs on one of the one or more PD channels during the TXOP.

In some implementations, in announcing the one or more PD channels, process 1400 may involve processor 1312 announcing a preamble puncturing pattern indicating, in each of one or more non-primary frequency segments, one or more channels that are not punctured during the TXOP such that each of the one or more STAs monitors one of the one or more channels in one of the one or more non-primary frequency segments as a respective PD channel to detect any transmission on the respective PD channel. Alternatively, in announcing the one or more PD channels, process 1400 may involve processor 1312 announcing a PD channel set indicating, in each of one or more non-primary frequency segments, one or more channels that are dedicated for the one or more STAs during the TXOP such that each of the one or more STAs monitors one of the one or more channels in one of the one or more non-primary frequency segments as the respective PD channel to detect any transmission on the respective PD channel.

In some implementations, the one or more non-primary frequency segments may include one or more non-primary 80-MHz frequency segments not including a 20-MHz primary channel on which channel access is performed. In such cases, in wirelessly communicating with the at least one of the one or more STAs, process 1400 may involve processor 1312 performing one or more of the following: (a) transmitting on one of the one or more non-primary 80-MHz frequency segments in an event that at least one PD channel in the PD channel set for the one of the one or more non-primary 80-MHz frequency segments is CCA idle; (b) not transmitting on the one of the one or more non-primary 80-MHz frequency segments in an event that all PD channels in the PD channel set for the one of the one or more non-primary 80-MHz frequency segments are CCA busy; (c) transmitting a DL frame to the at least one of the one or more STAs or triggering an UL transmission from the at least one of the one or more STAs in an event that the PD channel of the at least one of the one or more STAs is not punctured; and (d) not transmitting the DL frame to the at least one of the one or more STAs or triggering the UL transmission from the at least one of the one or more STAs in an event that the PD channel of the at least one of the one or more STAs is punctured.

In some implementations, the frequency segment may include a non-primary 80-MHz frequency segment which does not include a 20-MHz primary channel on which channel access is performed. In such cases, in wirelessly communicating with the at least one of the one or more STAs, process 1400 may involve processor 1312 transmitting on the frequency segment in an event that all 20-MHz channels in the frequency segment, which are indicated as being not punctured in the preamble puncturing pattern, are CCA idle. In some cases, in wirelessly communicating with the at least one of the one or more STAs, process 1400 may involve processor 1312 transmitting on the frequency segment in an event that at least one of a plurality of 20-MHz channels in the frequency segment, which is indicated as being not punctured in the preamble puncturing pattern, is CCA idle. Alternatively, in wirelessly communicating with the at least one of the one or more STAs, process 1400 may involve processor 1312 not transmitting on the frequency segment in an event that at least one of the plurality of 20-MHz channels in the frequency segment, which is indicated as being not punctured in the preamble puncturing pattern, is CCA busy.

In some implementations, the frequency segment may include a non-primary 80-MHz frequency segment which does not include a 20-MHz primary channel on which channel access is performed. Moreover, the management frame may include a beacon, a probe response, an association response, or a re-association response.

In some implementations, in announcing the one or more PD channels, process 1400 may involve processor 1312 exchanging control frames at a beginning of the TXOP with the one or more STAs to dynamically update the one or more PD channels in the frequency segment for the TXOP. In such cases, in wireless communicating, process 1400 may involve processor 1312 transmitting one or more preamble punctured PPDUs to the one or more STAs. In some implementations, the control frames may include EHT RTS and CTS frames.

In some implementations, in wirelessly communicating with the at least one of the one or more STAs, process 1400 may involve processor 1312 performing at least one of the following operations: (a) performing a DL transmission to the at least one of the one or more STAs after the at least one of the one or more STAs switching to a different PD channel in a same or a different frequency segment; and (b) triggering an UL transmission from the at least one of the one or more STAs after the at least one of the one or more STAs switching to the different PD channel in the same or the different frequency segment.

In some implementations, process 1400 may involve processor 1312 performing additional operations. For instance, process 1400 may involve processor 1312 updating the preamble puncturing pattern to a new preamble puncturing pattern indicating one or more different channels in the frequency segment that are not punctured during a subsequent transmission. Moreover, process 1400 may involve processor 1312 transmitting, on a primary channel on which channel access is performed, an update indicating the new preamble puncturing pattern.

In some implementations, in updating the preamble puncturing pattern, process 1400 may involve processor 1312 updating the preamble puncturing pattern periodically. Alternatively, process 1400 may involve processor 1312 updating the preamble puncturing pattern non-periodically as triggered by one or more of detection of a radar signal, load control, avoidance of reaching a power limit, detection of one or more incumbent devices, and interference caused by coexistence of one or more other system.

Figure 15:
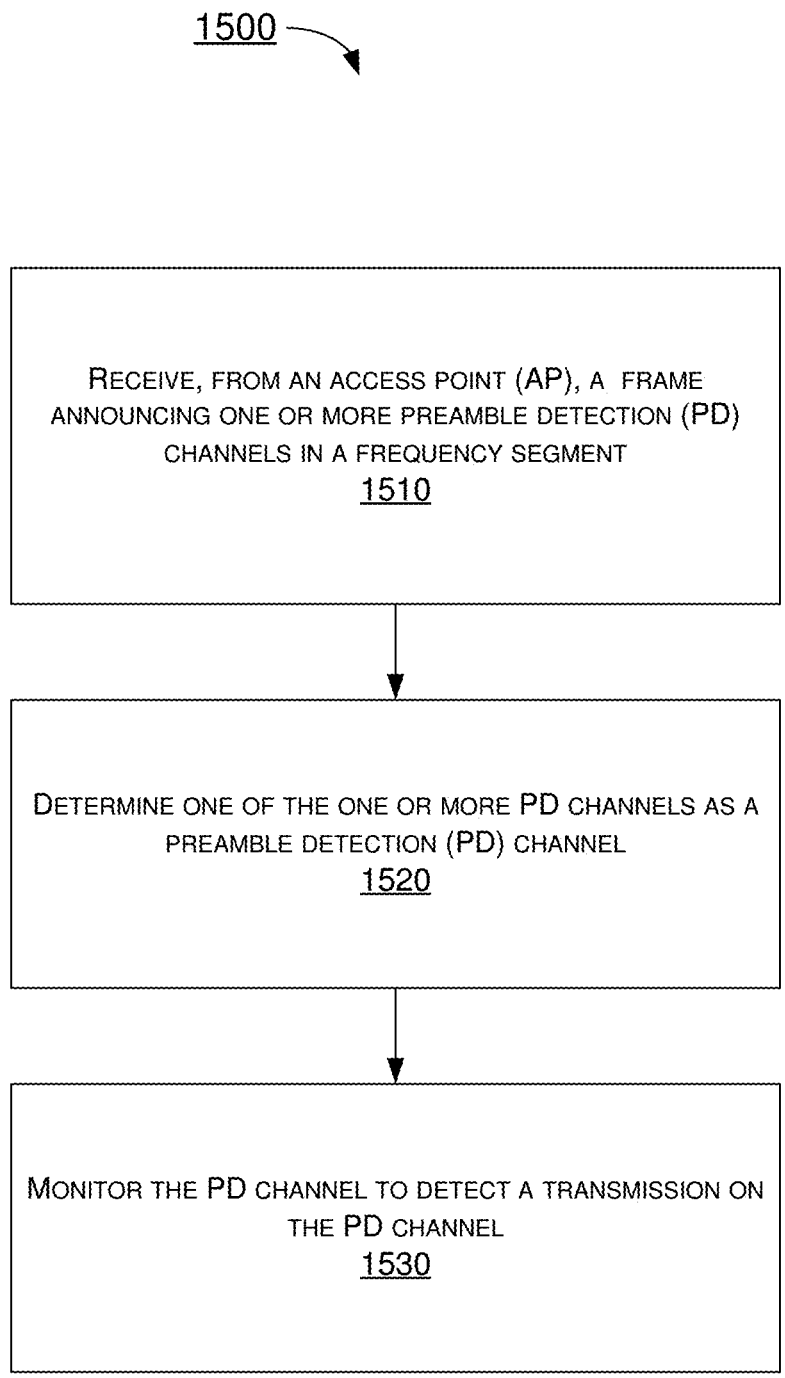
FIG. 15 is a flowchart of an example process in accordance with an implementation of the present disclosure.

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to preamble puncturing support for wide bandwidth transmission in wireless communications in wireless communications in accordance with the present disclosure. Process 1500 may include one or more operations, actions, or functions as illustrated by one or more of blocks 1510, 1520 and 1530. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1310 and apparatus 1320 as well as any variations thereof. Solely for illustrative purposes and without limiting the scope, process 1500 is described below in the context of apparatus 1310 implemented in or as STA 110 (e.g., AP STA) and apparatus 1320 implemented in or as STA 120 (e.g., non-AP STA) of a wireless network such as a WLAN in network environment 100 in accordance with one or more of IEEE 802.11 standards. Process 1500 may begin at block 1510.

At 1510, process 1500 may involve processor 1322 of apparatus 1320 receiving, via transceiver 1326, from an AP (e.g., apparatus 1310) a frame (e.g., a management frame) announcing one or more PD channels in a frequency segment (e.g., one or more channels that are not punctured during a transmission). Process 1500 may proceed from 1510 to 1520.

At 1520, process 1500 may involve processor 1322 determining one of the one or more PD channels as a PD channel. Process 1500 may proceed from 1520 to 1530.

At 1530, process 1500 may involve processor 1322 monitoring the PD channel to detect a transmission on the PD channel.

In some implementations, in receiving the frame announcing the one or more PD channels, process 1500 may involve processor 1322 receiving a preamble puncturing pattern indicating, in each of one or more non-primary frequency segments, one or more channels that are not punctured during a TXOP such that each of one or more STAs to which the frame is transmitted monitors one of the one or more channels in one of the one or more non-primary frequency segments as a respective PD channel to detect any transmission on the respective PD channel. Alternatively, in receiving the frame announcing the one or more PD channels, process 1500 may involve processor 1322 receiving a PD channel set indicating, in each of the one or more non-primary frequency segments, one or more channels that are dedicated for the one or more STAs during the TXOP such that each of the one or more STAs monitors one of the one or more channels in one of the one or more non-primary frequency segments as the respective PD channel to detect any transmission on the respective PD channel.

In some implementations, the one or more non-primary frequency segments may include one or more non-primary 80-MHz frequency segments not including a 20-MHz primary channel on which channel access is performed.

In some implementations, the frequency segment may include a non-primary 80-MHz frequency segment which does not include a 20-MHz primary channel on which channel access is performed. Moreover, the frame may include a beacon, a probe response, an association response, or a re-association response.

In some implementations, process 1500 may involve processor 1322 performing additionally operations. For instance, process 1500 may involve processor 1322 receiving, from the AP, an update indicating a new preamble puncturing pattern indicating one or more different channels in the frequency segment that are not punctured during a subsequent transmission. Moreover, responsive to receiving the update, process 1500 may involve processor 1322 switching to one of the one or more different channels as a new PD channel to monitor the new PD channel to detect any transmission on the new PD channel.

In some implementations, process 1500 may involve processor 1322 performing additionally operations. For instance, process 1500 may involve processor 1322 switching to a different frequency segment which does not include a primary channel on which channel access is performed.

In some implementations, process 1500 may involve processor 1322 performing additional operations. For instance, process 1500 may involve processor 1322 receiving a frame (e.g., an EHT RTS frame) from the AP at a beginning of a TXOP indicating the different frequency segment where a resource is allocated and a different PD channel in the different frequency segment. Additionally, process 1500 may involve processor 1322 switching to the different PD channel in the different frequency segment responsive to receiving the frame.

In some implementations, process 1500 may involve processor 1322 performing other operations. For instance, process 1500 may involve processor 1322 transmitting, via transceiver 1326, an indication of the switching via a parking segment switching announcement or via a parking segment switching request and response exchange. In such cases, in switching to the different frequency segment, process 1500 may involve processor 1322 switching to the different frequency segment responsive to one or more of a plurality of conditions. The plurality of conditions may include: (a) the preamble puncturing pattern having been updated by the AP, (b) no detection of any preamble from the AP on the PD channel for a timeout period, and (c) existence of an interference higher than an interference threshold in the frequency segment.

In some implementations, process 1500 may involve processor 1322 performing additionally operations. For instance, process 1500 may involve processor 1322 switching back to the primary channel. Additionally, process 1500 may involve processor 1322 selecting the PD channel to a different non-primary channel as a different PD channel. Moreover, process 1500 may involve processor 1322 transmitting, to the AP and via transceiver 1326, the selected PD channel indicating the different PD channel.

In some implementations, in transmitting the updated PD channel, process 1500 may involve processor 1322 transmitting the updated PD channel via a PD channel switching request. Moreover, in updating the PD channel, process 1500 may involve processor 1322 updating the PD channel responsive to at least one of the following: (a) no detection of any preamble from the AP on the PD channel for a timeout period, and (b) existence of an interference higher than an interference threshold in the PD channel.

In some implementations, process 1500 may involve processor 1322 performing additionally operations. For instance, process 1500 may involve processor 1322 detecting, on the PD channel, a preamble of an OBSS PPDU. Moreover, process 1500 may involve processor 1322 issuing a CCA reset request to a PHY of apparatus 1320 responsive to at least one of a plurality of conditions being met. In some implementations, the plurality of conditions may include the following: (a) the OBSS PPDU having a RSSI being less than an energy detection threshold, (b) a carrier lost indication being generated by the PHY prior to an end of a given period, and (c) a format violation indication being generated by the PHY prior to the end of the given period.

In some implementations, process 1500 may involve processor 1322 performing additionally operations. For instance, process 1500 may involve processor 1322 switching to a different PD channel or a different frequency segment. Furthermore, process 1500 may involve processor 1322 performing at least one of the following: (a) receiving a DL transmission from the AP after a switching delay upon the switching to the different PD channel or the different frequency segment; and (b) performing an UL transmission to the AP after the switching delay or a NAV synchronization delay upon switching to the different PD channel or the different frequency segment.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   announcing, to one or more stations (STAs), in a frame one or more preamble detection (PD) channels in a frequency segment such that each of the one or more STAs monitors a respective one of the one or more PD channels to detect any transmission on the one or more PD channels; and
   wirelessly communicating with at least one of the one or more STAs on one of the one or more PD channels during a transmission opportunity (TXOP),
   wherein the wirelessly communicating with the at least one of the one or more STAs comprises at least one of:
      performing a downlink (DL) transmission to the at least one of the one or more STAs after the at least one of the one or more STAs switching to a different PD channel in a same or a different frequency segment; and
      triggering an uplink (UL) transmission from the at least one of the one or more STAs after the at least one of the one or more STAs switching to the different PD channel in the same or the different frequency segment.

2. The method of claim 1, wherein the announcing of the one or more PD channels comprises:
   announcing a preamble puncturing pattern indicating, in each of one or more non-primary frequency segments, one or more channels that are not punctured during the TXOP such that each of the one or more STAs monitors one of the one or more channels in one of the one or more non-primary frequency segments as a respective PD channel to detect any transmission on the respective PD channel; or
   announcing a PD channel set indicating, in each of the one or more non-primary frequency segments, one or more channels that are dedicated for the one or more STAs during the TXOP such that each of the one or more STAs monitors one of the one or more channels in one of the one or more non-primary frequency segments as the respective PD channel to detect any transmission on the respective PD channel.

3. The method of claim 2, wherein the one or more non-primary frequency segments comprises one or more non-primary 80-MHz frequency segments not including a 20-MHz primary channel on which channel access is performed, and wherein the wirelessly communicating with the at least one of the one or more STAs comprises performing one or more of:
   transmitting on one of the one or more non-primary 80-MHz frequency segments in an event that at least one PD channel in the PD channel set for the one of the one or more non-primary 80-MHz frequency segments is clear channel assessment (CCA) idle;
   not transmitting on the one of the one or more non-primary 80-MHz frequency segments in an event that all PD channels in the PD channel set for the one of the one or more non-primary 80-MHz frequency segments are CCA busy;
   transmitting a downlink (DL) frame to the at least one of the one or more STAs or triggering an uplink (UL) transmission from the at least one of the one or more STAs in an event that the PD channel of the at least one of the one or more STAs is not punctured; and
   not transmitting the DL frame to the at least one of the one or more STAs or triggering the UL transmission from the at least one of the one or more STAs in an event that the PD channel of the at least one of the one or more STAs is punctured.

4. The method of claim 2, wherein the frequency segment comprises a non-primary 80-MHz frequency segment which does not include a 20-MHz primary channel on which channel access is performed, and wherein the wirelessly communicating with the at least one of the one or more STAs comprises:
    transmitting on the frequency segment in an event that all 20-MHz channels in the frequency segment, which are indicated as being not punctured in the preamble puncturing pattern, are clear channel assessment (CCA) idle; or
    not transmitting on the frequency segment in an event that at least one of a plurality of 20-MHz channels in the frequency segment, which is indicated as being not punctured in the preamble puncturing pattern, is CCA busy.

5. The method of claim 1, wherein the frequency segment comprises a non-primary 80-MHz frequency segment which does not include a 20-MHz primary channel on which channel access is performed, and wherein the frame comprises a beacon, a probe response, an association response, or a re-association response.

6. The method of claim 1, wherein the announcing of the one or more PD channels comprises exchanging control frames at a beginning of the TXOP with the one or more STAs to dynamically update the one or more PD channels in the frequency segment for the TXOP, and wherein the wireless communicating comprises transmitting one or more preamble punctured Physical Layer Conformance Procedure (PLCP) Protocol Data Units (PPDUs) to the one or more STAs.

7. The method of claim 6, wherein the control frames comprise extreme-high-throughput (EHT) request-to-send (RTS) and clear-to-send (CTS) frames.

8. A method, comprising:
    receiving, from an access point (AP), a frame announcing one or more preamble detection (PD) channels in a frequency segment;
    determining one of the one or more PD channels as a preamble detection (PD) channel; and
    monitoring the PD channel to detect a transmission on the PD channel,
    wherein the receiving of the frame announcing the one or more PD channels comprises receiving a PD channel set indicating, in each of one or more non-primary frequency segments, one or more channels that are dedicated for one or more STAs during a transmission opportunity (TXOP) such that each of the one or more STAs monitors one of the one or more channels in one of the one or more non-primary frequency segments as the respective PD channel to detect any transmission on the respective PD channel.

9. The method of claim 8, wherein the one or more non-primary frequency segments comprises one or more non-primary 80-MHz frequency segments not including a 20-MHz primary channel on which channel access is performed.

10. The method of claim 8, wherein the frequency segment comprises a non-primary 80-MHz frequency segment which does not include a 20-MHz primary channel on which channel access is performed, and wherein the frame comprises a beacon, a probe response, an association response, or a re-association response.

11. The method of claim 8, further comprising:
    receiving, from the AP, an update indicating a new preamble puncturing pattern indicating one or more different channels in the frequency segment that are not punctured during a subsequent transmission; and
    responsive to receiving the update, switching to one of the one or more different channels as a new PD channel to monitor the new PD channel to detect any transmission on the new PD channel.

12. The method of claim 8, further comprising:
switching to a different frequency segment which does not include a primary channel on which channel access is performed.

13. The method of claim 12, further comprising:
    receiving a frame from the AP at a beginning of a transmission opportunity (TXOP) indicating the different frequency segment where a resource is allocated and a different PD channel in the different frequency segment; and
    switching to the different PD channel in the different frequency segment responsive to receiving the frame.

14. The method of claim 12, further comprising:
    transmitting an indication of the switching via a parking segment switching announcement or via a parking segment switching request and response exchange,
    wherein the switching to the different frequency segment comprises switching to the different frequency segment responsive to one or more of a plurality of conditions comprising:
        the preamble puncturing pattern having been updated by the AP,
        no detection of any preamble from the AP on the PD channel for a timeout period, and
        existence of an interference higher than an interference threshold in the frequency segment.

15. The method of claim 12, further comprising:
    switching back to the primary channel;
    selecting the PD channel to a different non-primary channel as a different PD channel; and
    transmitting, to the AP, the selected PD channel indicating the different PD channel.

16. The method of claim 15, wherein the transmitting of the updated PD channel comprises transmitting the updated PD channel via a PD channel switching request.

17. The method of claim 8, further comprising:
    detecting, on the PD channel, a preamble of an overlapping basic service set (OBSS) Physical Layer Conformance Procedure (PLCP) Protocol Data Unit (PPDU); and
    issuing a clear channel assessment (CCA) reset request to a physical layer (PHY) responsive to at least one of a plurality of conditions being met,
    wherein the plurality of conditions comprise:
        the OBSS PPDU having a received signal strength indication (RSSI) being less than an energy detection threshold,
        a carrier lost indication being generated by the PHY prior to an end of a given period, and
        a format violation indication being generated by the PHY prior to the end of the given period.

18. The method of claim 8, further comprising:
    switching to a different PD channel or a different frequency segment; and
    performing at least one of:
        receiving a downlink (DL) transmission from the AP after a switching delay upon the switching to the different PD channel or the different frequency segment; and
        performing an uplink (UL) transmission to the AP after the switching delay or a network allocation vector (NAV) synchronization delay upon switching to the different PD channel or the different frequency segment.

\* \* \* \* \*